No. 11,740. Reissued May 9, 1899.
P. T. FRITZSCHE.
PROCESS OF OBTAINING ETHER.
(Application filed Jan. 20, 1899.)
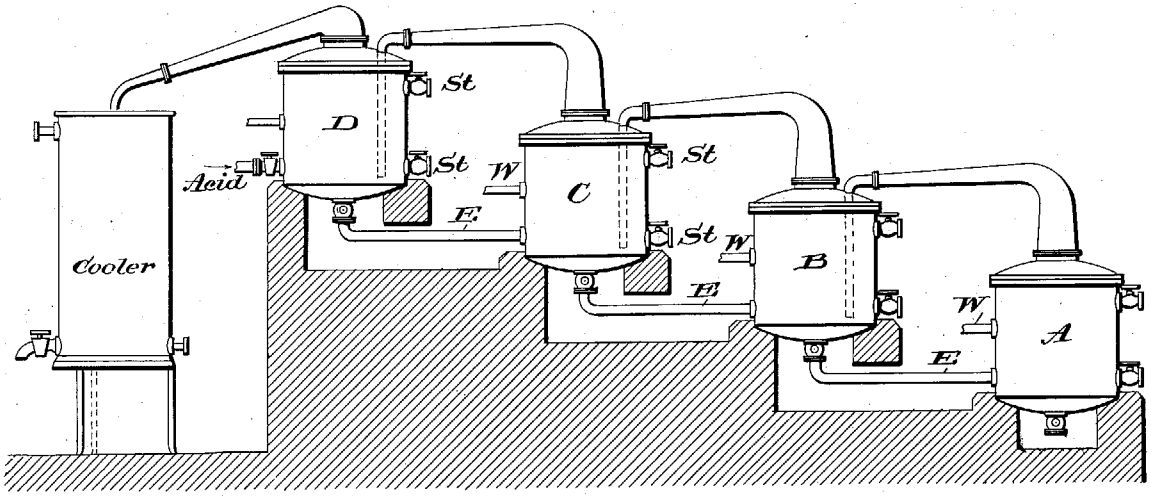
Witnesses
L. C. Hills
J. D. Kingsbury
Inventor
Paul Theodor Fritzsche
By Whittaker & Parsons
Attorneys

UNITED STATES PATENT OFFICE.

PAUL THEODOR FRITZSCHE, OF LEIPSIC, GERMANY, ASSIGNOR, BY MESNE ASSIGNMENTS, TO THE AMERICAN ETHER COMPANY OF RICHMOND, VIRGINIA, OF RICHMOND, VIRGINIA.

PROCESS OF OBTAINING ETHER.

SPECIFICATION forming part of Reissued Letters Patent No. 11,740, dated May 9, 1899.

Original No. 575,640, dated January 19, 1897. Application for reissue filed January 20, 1899. Serial No. 702,869.

*To all whom it may concern:*

Be it known that I, PAUL THEODOR FRITZSCHE, a subject of the Emperor of Germany, formerly residing at Essen, but now a resident of Leipsic, Germany, have invented new and useful Improvements in the Method of Obtaining Ether, of which the following is a specification.

When gases containing ethylene—as, for example, purified illuminating-gases or coke-oven gases—are treated with concentrated sulfuric acid for the purpose of extracting the ethylene by allowing them to pass through several wash-bottles charged with this acid, the acid is colored yellow and turns to brown in continued operation, while becoming more and more viscous. The coloring and increased density of the acid are caused by products of condensation—hydrocarbons of greater molecular weight, which are formed from simple gas components on contact with sulfuric acid and which dissolve in the acid. The greater mass of the products of condensation separates out in the first wash-bottle, as noticed by the coloring as well as by the increase of weight of the acid, while the succeeding bottles gain less in color and weight. After some time, as soon as the products of condensation have collected in sufficient quantity, the separation of an oily or even resinous layer is noticed on the surface of the fluid in the first vessel. If this thickened brown-colored acid is examined regarding its contents of ethyl sulfuric acid, it is found to contain less ethyl sulfuric acid than the acid from one of the following vessels, which appears less colored and thickened. The gas which has passed through the acid is found to be rich in ethylene, even if it has been so thoroughly freed from hydrocarbons yielding products of condensation as no longer to color sulfuric acid. The hydrocarbons or the products of their condensation can thus be more readily removed from the gas than ethylene; but at the same time they interfere with the absorbing capacity of sulfuric acid for ethylene. The hydrocarbons are therefore to be first removed from the gases. Concentrated sulfuric acid is not necessarily employed for this purpose. They can also be separated by treating the gas with moderately-diluted acid, especially when warm.

The combination of ethylene with sulfuric acid takes place slowly at ordinary temperature. If, however, the acid is heated, the combination with the ethylene is accelerated. By using pure sulfuric acid (ninety-five per cent. hydrate) and pure ethylene I found that the relative rapidity of absorption at 15° centigrade to that at 110° centigrade was as one to thirty—that is to say, at 110° centigrade thirty times as much ethylene is taken up in the same time by an equal surface moistened with sulfuric acid as at 15° centigrade. At 140° centigrade the relation is one to fifty. By further increase of temperature the rapidity of absorption is further increased. Even dilute acid of about eighty per cent. hydrate at temperatures over 100° centigrade richly absorbs ethylene.

It might be concluded herefrom that for rapidly and thoroughly freeing a given quantity of gas from ethylene and obtaining ethyl sulfuric acid it would be practical to heat gas and acid to the highest possible temperature; but this proceeding is limited by the decomposition of ethyl sulfuric acid occuring at higher temperature. If ethyl sulfuric acid by itself is heated for some time only to 140° centigrade, there is found, in addition to a slight ether formation, a noticeable decomposition, accompanied by generation of sulfurous acid, involving material loss. Neither can this decomposition be entirely avoided if gas and acid are heated to from 110° to 120° centigrade; but the generation of sulfurous acid is then so feeble that no material loss need be feared. On heating a mixture of sulfuric acid and ethyl sulfuric acid containing fifty per cent. ethyl sulfuric acid for two hours to 120° centigrade only a slight decrease of ethyl sulfuric acid could be established after heating.

If the sulfuric acid used for absorption of ethylene is not free from water, or if the ethylene is not dry, the resulting ethyl sulfuric acid on continued heating to 120° centigrade gives off a mixture of alcohol and ether vapor. On heating to higher temperature the vapor generation is more copious; but at the same time this acid absorbs ethylene. Theoretically it might thus be possible with a slight quantity of sulfuric acid to continuously convert an unlimited quantity of ethylene into a mixture of alcohol and ether.

In my experiments for obtaining ether free from alcohol from ethyl sulfuric acid I found the following: Pure concentrated ethyl sulfuric acid or a mixture of the same with sulfuric acid on being heated to from 130° to 140° centigrade generates only traces of ether. At higher temperatures with a generation of sulfurous acid ethylene becomes free. If the ethyl sulfuric acid or a mixture thereof with concentrated sulfuric acid is diluted with a small quantity (ten per cent., by weight) of water, very little ether is obtained, but at the same time small quantities of alcohol. If the mixture is diluted with a larger quantity of water, more ether is obtained; but the vapors then excessively contain alcohol. No matter how the proportion of water of the mixture may be varied no degree of dilution is obtained at which the yield of ether is even approximately satisfactory. On the other hand, small quantities of ether are generated even when the ethyl sulfuric acid is diluted with the same weight of water and heated to boiling. Here it has no material influence whether the mixture contains much or little free sulfuric acid. If the proportion of water of the mixture is greater than fifty per cent., the ether formation stops, and only alcohol is then generated.

The experiment of conducting the vapors generated from a mixture of equal parts of sulfuric acid and ethyl sulfuric acid diluted with ten per cent. of water through a cooler which was kept at a temperature of 40° centigrade and which allowed the condensed vapors to run back gave the result that the alcohol, the proportion of which was very high, was condensed, but the quantity of ether was not increased.

The vapors from heating a certain amount of diluted ethyl sulfuric acid, consisting of ether, alcohol, and water, will be enriched in ether when they are passed through an equal quantity of ethyl sulfuric acid, sulfuric acid, or a mixture of the two. After a short while, however, when the acid through which the vapors are passed becomes slightly diluted, ethylene is produced, and on higher dilution no more ether is formed. As, in order to avoid loss in consequence of ethylene formation on heating, the ethyl sulfuric acid or sulfuric acid or a mixture of the two must always be diluted with water, I devised the following process, which allows a given quantity of ethyl sulfuric acid to be separated into ether and sulfuric acid, according to the formula equation:

$$2(C_2H_5OSO_2OH)+H_2O=(C_2H_5)_2O+2H_2SO_4.$$

This process may be carried out in the apparatus illustrated by the accompanying drawing.

Four retorts or distilling vessels A B C D are so connected that the vapors generated in a preceding vessel can only pass off through a tube reaching close to the bottom of the succeeding vessel. From D the vapors pass into an effective condenser. The vessel A is charged with ethyl sulfuric acid, and each of the other vessels is charged with an equal quantity of ethyl sulfuric acid or sulfuric acid, or a mixture of the two. The contents of A, B, and C are diluted with water, so that the proportion of water in A amounts to about thirty-five per cent.; in B, to about twenty-two per cent., and in C to about ten per cent., while the acid in D remains undiluted. The distillation is started by vigorously heating the contents of A, while at the same time the contents of B are but slightly warmed. The vapors escaping in a short time from A and consisting of alcohol, ether, and water-vapor dissolve at first in the liquid in B; but in a short time the boiling begins here also. The contents of C and D have also in the meantime been moderately heated, so that the vapors passing from B, which are already richly charged with ether, also promptly effect a boiling in C and cause the vapors to escape to D. If the ethyl sulfuric acid employed is of high percentage, if it contains little sulfuric acid, the ether vapors escaping from C pass already at the start unchanged through the acid in D; but the alcohol-vapors still passing over with the ether-vapors act upon the ethyl sulfuric acid and are likewise converted into ether, so that the vapors entering the cooler only contain ether and water vapors. If the ethyl sulfuric acid employed is, however, rich in free sulfuric acid, the ether and alcohol vapors passing at the start from C to D dissolve in the free acid under formation of ethyl sulfuric acid until equilibrium is attained, when the ether passes unchanged through the mixture, while the remaining quantities of alcohol are fully converted into ether.

If the vessels B, C, and D are charged originally with sulfuric acid, the first effect of the vapors of alcohol and ether passing through the acid in said vessels will be to convert the sulfuric acid into ethyl sulfuric acid, after which the operation will proceed as above set forth.

The ether-vapors are condensed with the water-vapors in the cooler and led into suitable receptacles.

If the distillation is properly conducted, the contents of D must not increase, while in B a copious and in C a weaker increase must be noticeable.

If the acid in A is so far concentrated that the distillation in B no longer continues without external application of heat, the operation is interrupted, the acid emptied from A, the contents of B brought into A, of C into B, of D into C, and a fresh supply of undiluted acid poured into D. After the contents of A, B, and C have been again brought to the above-indicated dilution the distillation can be recommenced and again yields corresponding quantities of ether. The same operation can then be repeated as often as desired with the same result, and the acid emptied from A will always be thoroughly exhausted, while ether free from alcohol is obtained from D.

It is clear that the number of boilers is not limited to four nor the dilution strictly to the above-indicated percentage. The process was carried out with a mixture of ethyl sulfuric and sulfuric acids, which contained fifty per cent. of ethyl sulfuric acid, and in this case the above conditions were found effective. If the ethyl sulfuric acid is of high percentage, three vessels can be made to answer, since in this case the vapors passing from the first vessel are much richer in ether and contain less water and alcohol than those obtained from a poorer acid diluted with the same quantity of water. In this case the acid with ten per cent. water (vessel C) can be omitted. In regard to the dilution in the first vessel A it is not possible to pass materially below the indicated percentage without suffering loss, since otherwise even in slow distillation the acid attains a high concentration before all the ethyl sulfuric acid is decomposed, so that ethylene begins to be generated.

From the disclosed facts the following process is disclosed for obtaining ether from gases containing ethylene, such as illuminating-gas, coke-oven gas, and the like.

The gases freed from tar, ammonia, benzene, and sulfureted hydrogen must first be dried. This is most readily effected by combining the drying and the separation of the products of condensation and treating the gas either with cold sulfuric acid of about eighty per cent. hydrate or with diluted sulfuric acid of less than eighty per cent. hydrate at a temperature of from 70° to 80° centigrade. By this means also at the same time the homologues of the ethylene which may be present, propylene, butylene, and the like, which already on contact with diluted sulfuric acid yield corresponding alkyl sulfuric acids, are removed from the gas in advance of the ethylene.

After all hydrocarbons and other gas components which might oppose the absorbing capacity of sulfuric acid for ethylene and the purity of ethyl sulfuric acid are removed in this manner as thoroughly as possible the gas is heated, preferably, to from 110° to 120° centigrade by being passed through heating-chambers provided with heating appliances. From here it passes into the absorption apparatus, which are sprayed with hot concentrated sulfuric acid and in which the temperature can be kept at from 110° to 120° centigrade. Apparatus resembling scrubbers and lined with acid-resisting stones, which offer the largest possible surface to the acid, and thereby effect a thorough contact between gas and acid, is well adapted for this purpose. Four to five such apparatus succeeding one another are employed, and the fresh acid is continually supplied at the outlet of the last apparatus at which the gas leaves the apparatus. The acid collecting on the bottom of the last apparatus is taken by a pump to the next to the last apparatus, where it again flows against the gas. The like occurs at the other apparatus, so that the ethyl sulfuric acid containing the highest percentage collects at the foot of the first apparatus where the gas enters. This acid is advantageously brought only to a strength of from fifty to sixty per cent. of ethyl sulfuric acid.

The hot mixture of ethyl sulfuric acid and sulfuric acid is led to the distilling apparatus and transformed into ether. It is advisable to employ for this purpose an apparatus for continuous operation. The separate parts of the apparatus are connected with one another, as indicated in the drawing. Each boiler, of which three or more are employed, is provided with special heating arrangement, either with direct or indirect firing and a regulated overflow or outflow E, through which the desired quantity of fluid flows uninterruptedly from a higher part of the apparatus into the next succeeding lower one. With the exception of the highest boiler each compartment has water supplied through a pipe or inlet *w* at the place where the acid flows in from the overflow. The same enabled the proportion of water of the acid mixture in each separate compartment to be brought to the required degree. From the highest boiler, where the hot acid continually flows in, the ether-vapors, which on their upward path in the apparatus are entirely freed from alcohol, pass into the condenser and are condensed, together with the water-vapors. The ether obtained is subjected to the usual cleansing by washing with soda or the like and to rectification. This method of obtaining ether from alcohol may be used when obtaining ether from sulfuric acid and alcohol in a well-known manner.

The vessels may be heated by suitable means, as by a steam-coil in each vessel having its inlet and outlet at *St*.

What I claim as new, and desire to secure by Letters Patent, is—

1. The method herein described of obtaining ether from gases containing ethylene, which consists in washing the gases after the removal of tar, ammonia, benzene and sulfureted hydrogen with dilute sulfuric acid to remove hydrocarbons of condensation, then treating the same with concentrated sulfuric acid at a temperature of from 100° to 140° centigrade to absorb the ethylene, and after dilution subjecting the resulting ethyl sulfuric acid to distillation and passing the resulting vapors of ether, alcohol and water, according to their ether contents, through ethyl sulfuric acid of varying degrees of dilution, substantially as set forth.

2. In the method of obtaining ether from gases containing ethylene, herein set forth, the subprocess which consists in forming or producing ethyl sulfuric acid from said gas; then diluting said ethyl sulfuric acid and subjecting the same to distillation, then passing the resulting vapors of ether, alcohol and water according to their ether contents through ethyl sulfuric acid of varying degrees of dilution, substantially as described.

3. In the method herein set forth the subprocess for producing ether free from alcohol which consists of the following steps: boiling ethyl sulfuric acid, then passing the alcohol-ether vapors according to their ether contents through ethyl sulfuric acid of varying degrees of dilution substantially as described.

4. The method of obtaining ether free from alcohol which consists in passing the alcoholic ether-vapors arising from the boiling of ethyl sulfuric acid with water according to their contents of alcohol and ether through quantities of sulfuric acid of various degrees of concentration, substantially as described.

In testimony whereof I have hereunto set my hand in the presence of two subscribing witnesses.

PAUL THEODOR FRITZSCHE.

Witnesses:
RUDOLPH FRICKE,
PAUL KNOBE.